United States Patent
Shellenberger (12) 
(10) Patent No.: US 10,351,027 B2
(45) Date of Patent: Jul. 16, 2019

(54) CARRY HANDLE RELEASE MECHANISM FOR A CHILD SEAT

(71) Applicant: ARTSANA USA, INC., Lancaster, PA (US)

(72) Inventor: Mitchell L. Shellenberger, Mount Joy, PA (US)

(*) Notice: Subject to any disclaimer, the term of this patent is extended or adjusted under 35 U.S.C. 154(b) by 184 days.

(21) Appl. No.: 15/006,222

(22) Filed: Jan. 26, 2016

(65) Prior Publication Data

US 2016/0221479 A1   Aug. 4, 2016

Related U.S. Application Data

(60) Provisional application No. 62/109,338, filed on Jan. 29, 2015.

(51) Int. Cl.
*B60N 2/28* (2006.01)

(52) U.S. Cl.
CPC ......... *B60N 2/2845* (2013.01); *B60N 2/2821* (2013.01); *B60N 2/2863* (2013.01); *B60N 2/2872* (2013.01); *B60N 2/2878* (2013.01)

(58) Field of Classification Search
CPC .. B60N 2/2845; B60N 2/2863; B60N 2/2872; B60N 2/2821; B60N 2/2878; A47D 13/025
USPC .................. 297/183.2, 183.3, 183.4, 250.1
See application file for complete search history.

(56) References Cited

U.S. PATENT DOCUMENTS

| | | | |
|---|---|---|---|
| 5,522,639 A | 6/1996 | Jaime | |
| 5,961,180 A | 10/1999 | Greger et al. | |
| 5,971,476 A | 10/1999 | Gibson et al. | |
| 6,145,927 A | 11/2000 | Lo | |
| 6,715,828 B1 | 4/2004 | Cheng | |
| 6,910,696 B2 * | 6/2005 | Bargery | B60N 2/2845 280/30 |
| 6,983,986 B2 | 1/2006 | Jane Santamaria | |
| 7,455,354 B2 | 11/2008 | Jane Santamaria | |
| 7,488,034 B2 | 2/2009 | Ohren et al. | |
| 8,714,639 B2 | 5/2014 | Heisey | |
| 8,998,312 B2 | 4/2015 | Sellers et al. | |
| 2005/0168023 A1 | 8/2005 | Gangadharan et al. | |
| 2007/0262291 A1 | 11/2007 | Jane Santamaria | |
| 2014/0008951 A1 | 1/2014 | Spence et al. | |
| 2014/0368009 A1 | 12/2014 | Haut | |

* cited by examiner

*Primary Examiner* — Milton Nelson, Jr.
(74) *Attorney, Agent, or Firm* — Patent Law Associates (57) ABSTRACT

A child safety seat includes a seat shell having a child seating area configured to hold an infant or small child and a mounting base for securing the seat shell into a vehicle. The seat shell includes handle mounts located on opposite lateral sides of the seating area configured to attach opposing ends a movable carry handle in a manner enabling pivoting movement thereof. The carry handle includes a pair of lock mechanisms, one disposed at each handle end that enables the handle to be fixed into a selected pivotal position. Each lock mechanism includes a release actuator enabling the lock mechanism to be unlocked so that the carry handle may be repositioned. The release actuators are interconnected in a manner such that releasing movement of one will be transferred to the other, enabling simultaneous release of both lock mechanisms by operation of either release actuator.

11 Claims, 7 Drawing Sheets

CARRY HANDLE RELEASE MECHANISM
FOR A CHILD SEAT

CROSS REFERENCE TO RELATED
APPLICATIONS

This application claims the benefit of priority of U.S. Provisional Application 62/109,338, filed Jan. 29, 2015.

BACKGROUND OF THE INVENTION

The present application relates generally to the field of child safety seats. More particularly, the present invention relates to a child safety seat carry handle enabling one-handed release for movement of the carry handle for increased user convenience.

Improvements in child safety seats during the recent past has resulted in an extremely useful child care accessory, one that no parent wants to be without. Convenience and ease of use are paramount and most models are configurable for use as a safety seat in a vehicle or as a stand-along carrier for an infant. The transition between free-standing safety seat use and use in a vehicle, often by connecting the safety seat to a mounting base that is anchored to a vehicle seat, is further complicated by the need to reposition a carry handle while also positioning the seat for engagement into the mounting base. A similar situation exists when removing the safety seat from the vehicle for free-standing use.

There is a need for a child safety seat having a carry handle that may be released to permit selective repositioning of the handle by a user wherein the release may be activated with a single hand. Additional advantages would be realized by a carry handle release for a child safety seat that could be conveniently operated from either side of the seat using either hand of a user.

SUMMARY OF THE INVENTION

Accordingly, the present invention, in any of the embodiments described herein, may provide one or more of the following advantages:

According to one embodiment of the present invention, a child safety seat includes a seat shell having a child seating area configured to hold an infant or small child and a mounting base for securing the seat shell into a vehicle. The seat shell includes handle mounts located on opposite lateral sides of the seating area configured to attach opposing ends a movable carry handle in a manner enabling pivoting movement thereof. The carry handle includes a pair of lock mechanisms, one disposed at each handle end that enables the handle to be fixed into a selected pivotal position. Each lock mechanism includes a release actuator enabling the lock mechanism to be unlocked so that the carry handle may be repositioned. The release actuators are interconnected in a manner such that releasing movement of one will be transferred to the other, enabling simultaneous release of both lock mechanisms by operation of either release actuator.

It is a further object of the present invention to provide a child safety seat with a moveable carry handle having ends connected to laterally opposing of the safety seat wherein each handle end includes a locking mechanism with a selective lock release actuator, actuation of which releases the respective locking mechanism, actuation of both enabling movement of the carry handle. An interconnecting device synchronizes movement of the release actuators so that actuation of either releases both locking mechanism. The interconnecting device does not require the addition of an additional actuator in the handle assembly.

It is a further object of the present invention to provide a movable carry handle for a child safety seat having releasable locking mechanisms at opposing handles ends where the handle is pivotally connected to the seat and an interconnecting device synchronizing movement of actuators which release the locking mechanisms so that both locking mechanisms are simultaneously unlocked upon actuation of either release that is durable in construction, inexpensive of manufacture, carefree of maintenance, easily assembled, and simple and effective to use.

These and other objects are achieved in accordance with the instant invention by providing a child safety seat includes a seat shell having a child seating area configured to hold an infant or small child and a mounting base for securing the seat shell into a vehicle. The seat shell includes handle mounts located on opposite lateral sides of the seating area configured to attach opposing ends a movable carry handle in a manner enabling pivoting movement thereof. The carry handle includes a pair of lock mechanisms, one disposed at each handle end that enables the handle to be fixed into a selected pivotal position. Each lock mechanism includes a release actuator enabling the lock mechanism to be unlocked so that the carry handle may be repositioned. The release actuators are interconnected in a manner such that releasing movement of one will be transferred to the other, enabling simultaneous release of both lock mechanisms by operation of either release actuator.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED
EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined from the perspective of an occupant sitting in the seat normally. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
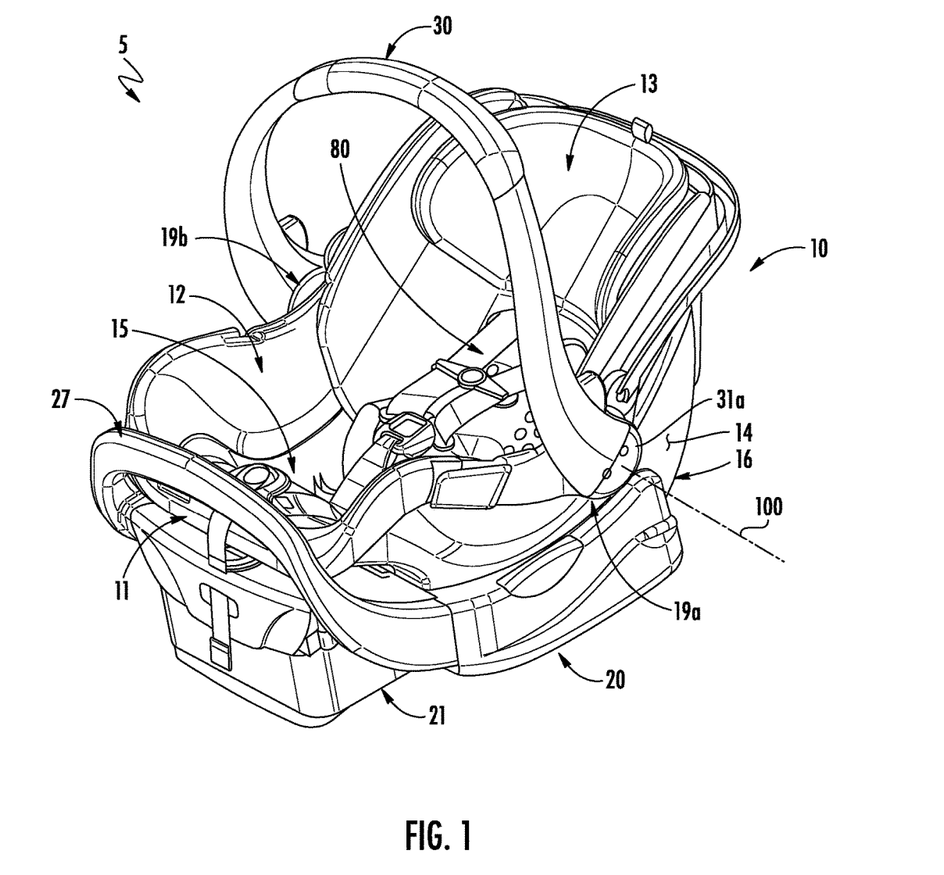
FIG. 1 is a perspective view of a child safety seat of the type on which the present invention is useful showing a carry handle in a first position suitable for lifting the safety seat.
Figure 2:
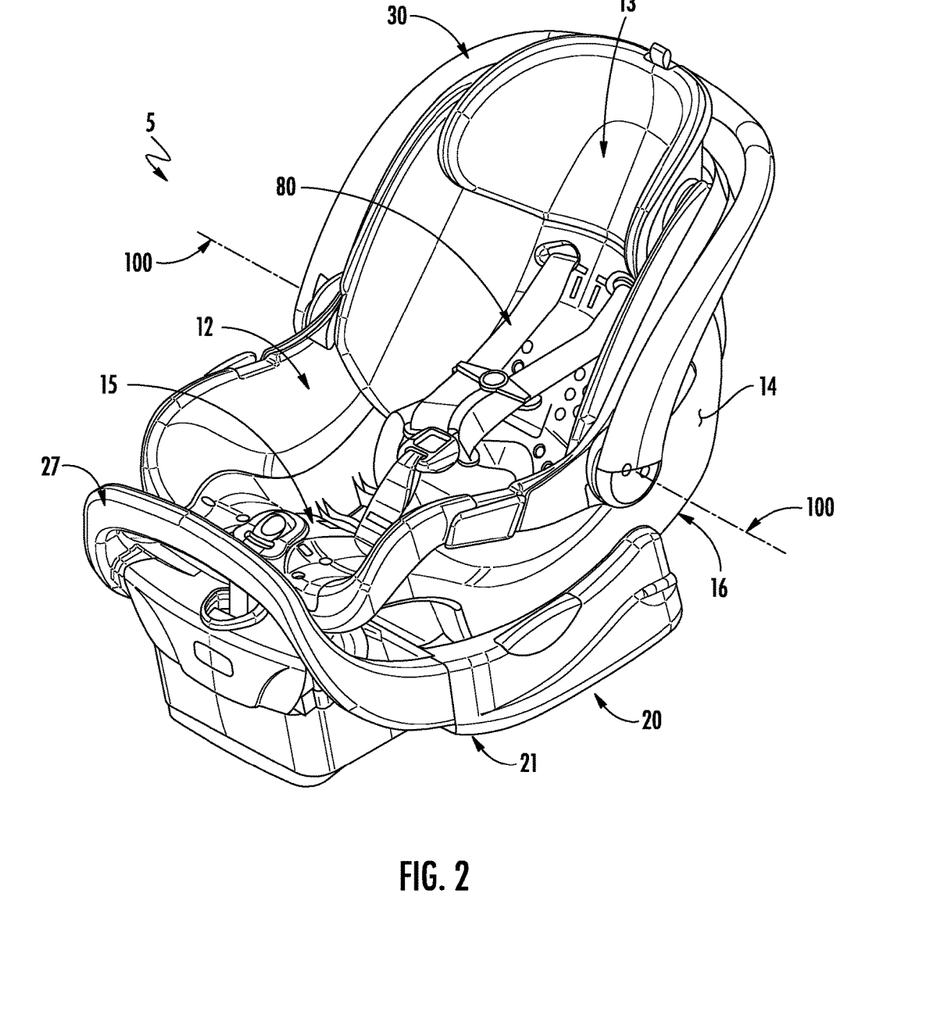
FIG. 2 is a perspective view of the child safety seat of FIG. 1, shown with the carry handle in a second position.
Figure 3:
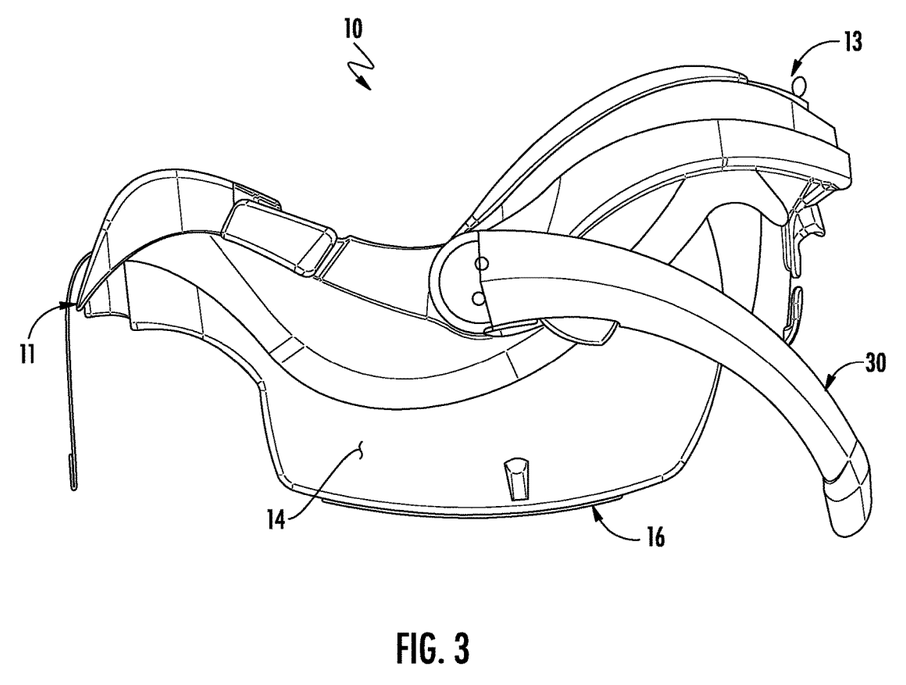
FIG. 3 is a side elevation view of the child safety seat of FIG. 1 shown with the handle in a third position suitable for stabilizing the safety seat on a surface.
Figure 4:
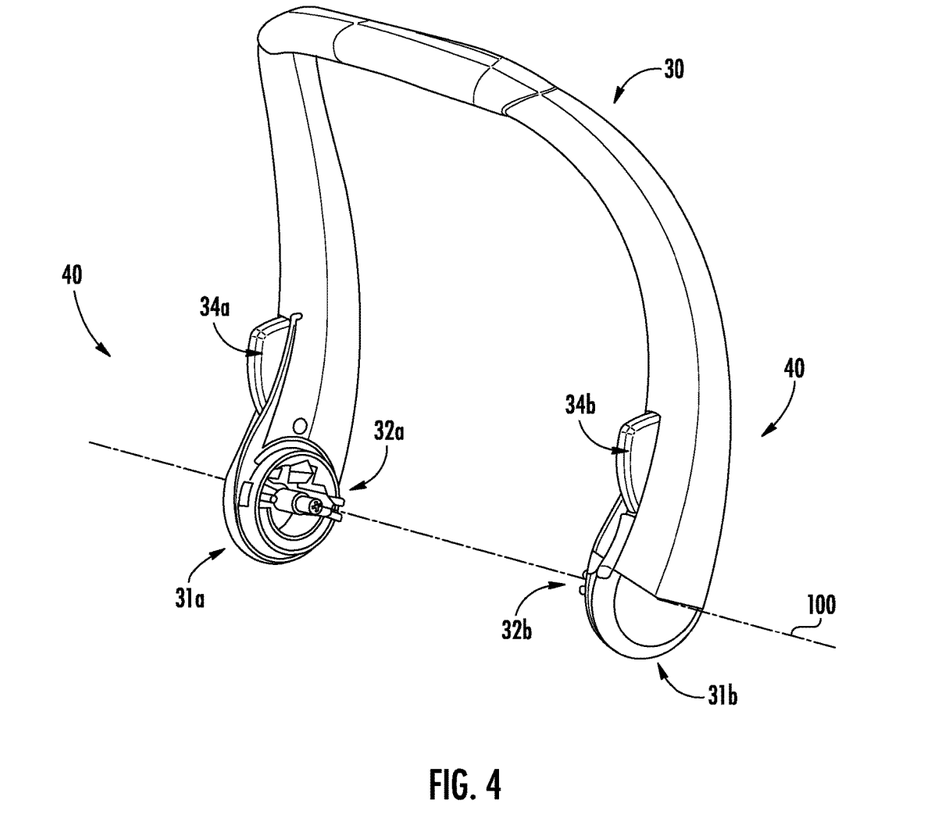
FIG. 4 is view of a handle for carrying the safety seat shell.
Figure 5:
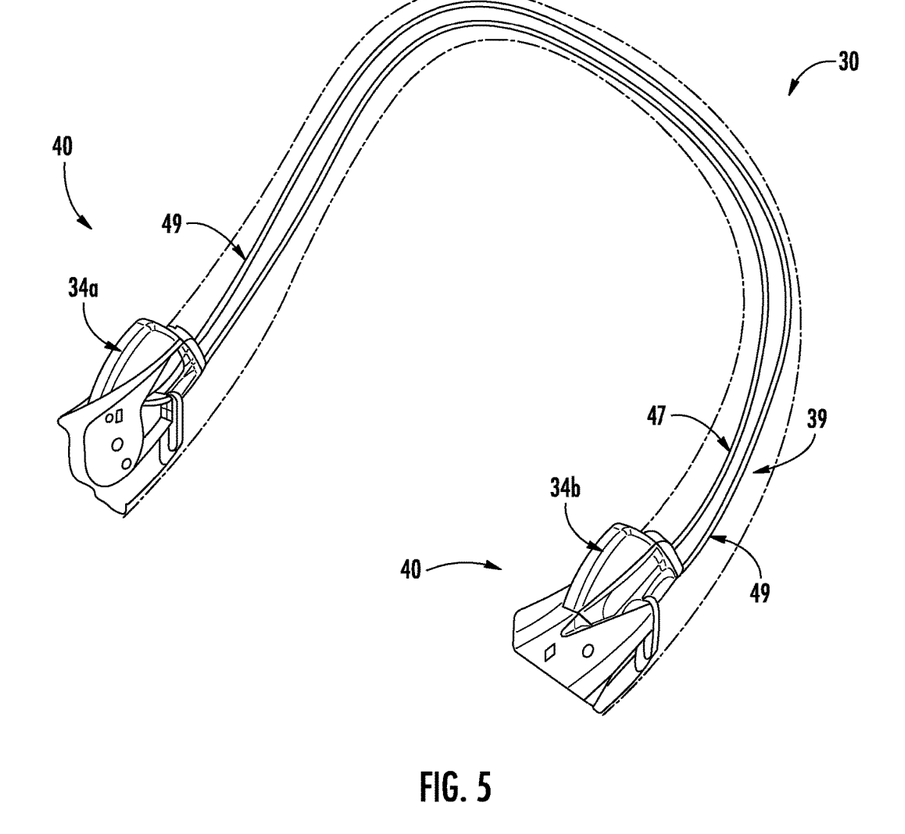
FIG. 5 is a partial cutaway view of the handle shown in FIG. 3 showing the handle release mechanism.
Figure 6:
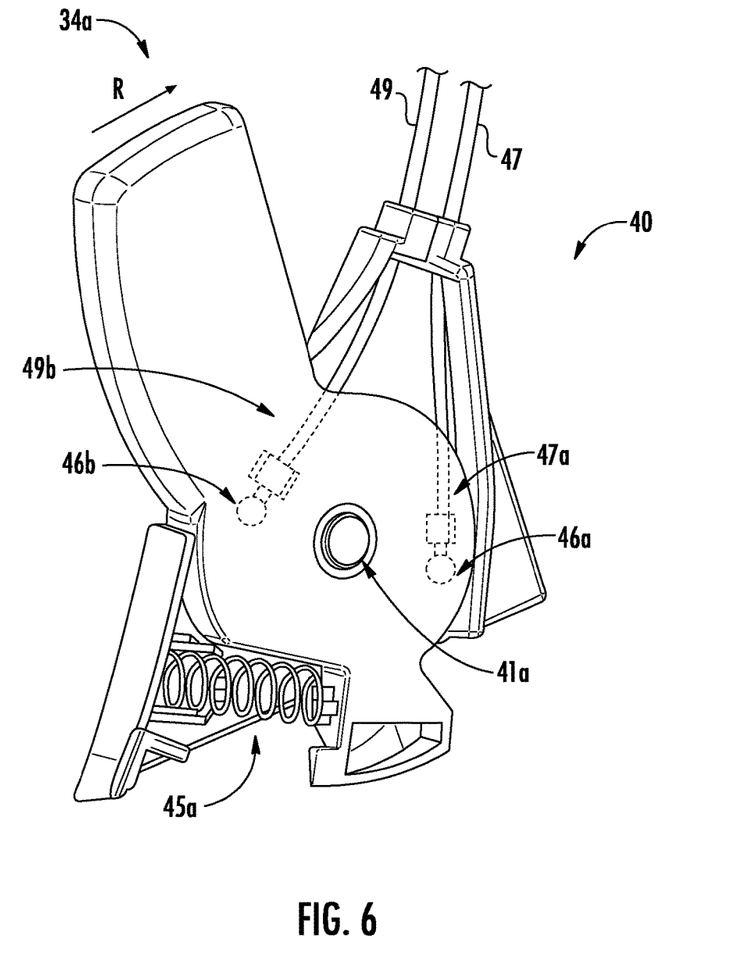
FIGS. 6 and 7 illustrate the lock mechanism release actuators and the connection details for the release interconnection.
Figure 7:
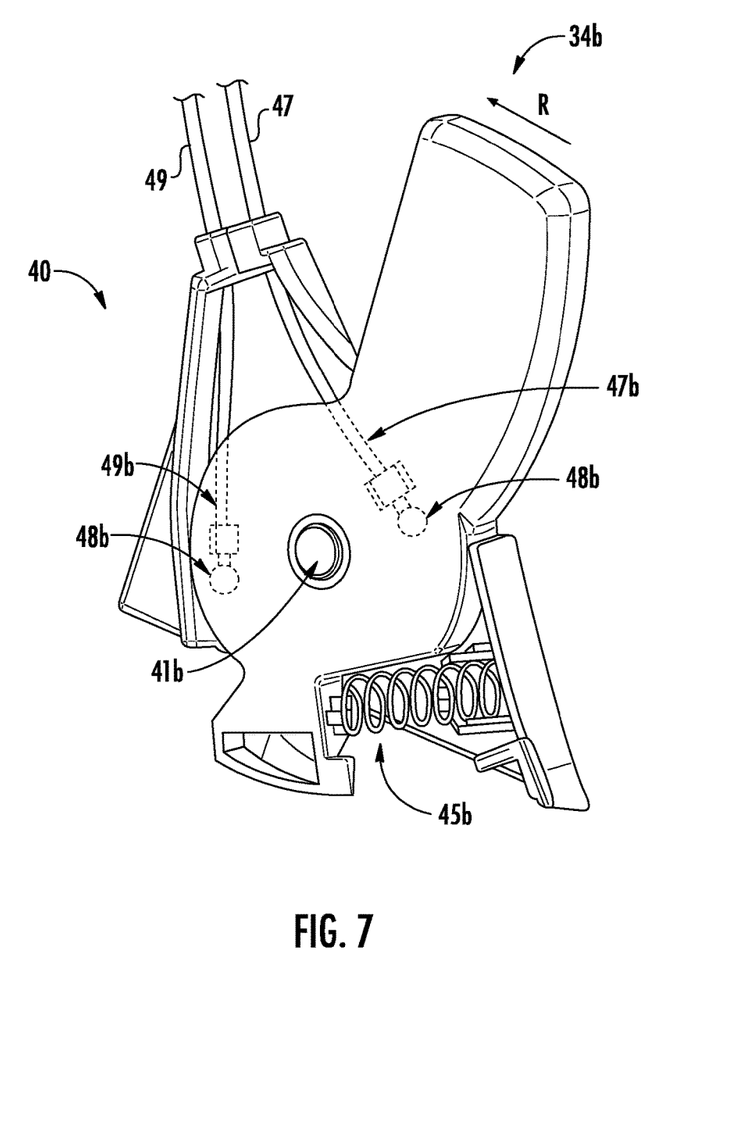

Referring generally to the figures and specifically to FIGS. 1 through 3, there is shown a child safety seat assembly 5 incorporating aspects of the present invention. The safety seat assembly 5 includes a seat shell 10 having an interior infant seating area 12 generally shaped to contain an infant or small child therein. The infant seating area 12 includes a seat bottom 15 with forward seat edge 11 and a back rest 13 upwardly angled from the seat bottom 15 opposite of the forward seat edge 11. An exterior portion 14 of the shell may include support feet 16 for allowing the seat shell 10 to rest on a generally level surface. The support feet 16 may be curved along their lowermost edge to allow the seat shell 10 to rock forward and backward while resting on a level surface. A plurality of belts 80 are provided in the interior portion to comfortably secure the child to the seat shell 10 during use. The belts 80 are secured to the structure of the seat shell by conventional means and include provisions for adjustment to accommodate occupants of various sizes.

The seat shell 10 may be connected to a base 20 which is configured to enable the seat assembly 5 to be conveniently and securely positioned in a vehicle seat. Anchor belts (not shown) are typically provided to secure the base 20 to the vehicle seat using Lower Anchors and Tethers for Children (LATCH) connectors or safety belts installed in the vehicle. The base 20 and seat shell 10 include a conveniently releasable connection mechanism that permits the seat shell 10 to be conveniently detached from the base 20 while also providing a secure connection when attached.

Soft goods and padding are typically provided to substantially cover the interior portion of the seat shell to improve comfort and offer pleasing aesthetics. For clarity, soft goods are not shown in the accompanying figures.

The seat shell 10 further comprises first and second handle mounts 19a, 19b on laterally opposing sides of the seating area 12 to which a movable handle 30 is connected. The handle 30 is a generally loop-shaped structure that includes generally opposing first and second ends 31a, 31b that connect to the first and second handle mounts 19a, 19b, respectively, in a manner permitting pivoting movement of the handle 30 about a transverse axis 100. The pivoting movement of the handle 30 allows it to be positioned as a handle for carrying the seat shell or lifting it for installation or removal to or from the base (FIG. 1), in a location compatible with installation of the seat shell onto the base for use in a vehicle (FIG. 2), or as a stabilizer for the seat shell when resting on a surface (FIG. 3). Other handle positions are also enabled by the pivoting connection and provide utility of the handle as a user may envision.

The first and second handle ends 31a, 31b each include a positioner lock 32a, 32b disposed thereon that allows the angular position of the handle 30 to be fixed within the range of movement of the handle 30. Such locking devices are commonly used in such applications and may comprise a simple frictional brake, a latching element engaging one of a series of latching receivers, ratcheting style latches, or the like which are selectively engageable or releasable to enable the handle to be retained in a fixed pivoting position. Each positioner lock includes a release actuator 34a, 34b located on the handle 30 proximate to the lock 32a, 32b mechanism configured to release the respective positioner lock to allow the handle 30 to pivot. As each positioner lock 32 impedes pivoting of its respective end 31a, 31b about the transverse axis 100, both releases 34a, 34b must be simultaneously released in order to allow the handle 30 to pivot.

Referring now to FIGS. 4 through 7, a first embodiment of the release mechanism 40 is illustrated. The mechanism 40 comprises the afore-described release actuators 34a, 34b which are movably coupled to respective ends 31a, 31b of the handle 30 by pivot pins 41a, 41b and configured for pivoting movement between released and locked positions. A spring 45a, 45b or similar biasing device urges the respective release actuator toward the locked position shown in FIG. 4.

First and second cables 47, 49 are connected at respective opposing first and second ends 47a, 47b, 49a, 49b to the release actuators 34a, 34b. The actuators 34a, 34b each include a first connector 46a, 48a and a second connector 46b, 48b, respectively. The first and second connectors are generally positioned on opposite sides of the actuator pivot pin 41. The first ends 47a, 49a of the cables are connected to respective first connectors 46a, 48a on the actuators while the second ends 47b, 49b of the cables are connected to respective second connectors 46b, 48b. The cables 47, 49 extend through an interior portion 39 of the handle 30 which is preferably substantially hollow. Conduits, cable guides, and the like may be provided in the interior portion to manage the cable position during motion and reduce frictional resistance to cable movement.

Moving either one of the actuators from the locked position toward the released position (arrow "R" in FIGS. 6 and 7) applies a tension force to the associated first end 47a, 49a of the cable. The associated tensioned cable transfers the tension force to the second end 47b, 49b which causes the opposing actuator to also move toward the released position. For example, moving the first actuator 34a toward the released position applies tension to first end 47a of first cable 47 at the first end 46a which in turn applies a tension force at second end 47b and second connector 48b thereby pivoting the second actuator 34b toward the released position. Moving the second actuator 34b produces a similar result as the second cable 49 will transfer a tension force to the first actuator 34a causing it to be pivoted toward the released positon. In this manner, both release actuators may be actuated by user operation of either. As both actuators must be moved to the released position before the handle 30 may be moved, the interconnection enables one-handed release of the handle without resorting to a third actuator device.

In an alternate embodiment, the first and second cables may be connected to form a continuous loop spanning between the first and second actuators 34a, 34b. In this embodiment, the loop must pass around the actuator pivot pins 41 or be otherwise secured to the actuator so that tension applied to the respective side of the loop will cause the pivoting movement of the actuators in the required directions, typically resembling a figure-eight arrangement extending between the respective actuators.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A child safety seat having a movable handle comprising:
   a seat shell having an infant seating area and first and second handle mounts on opposing sides of the infant seating area;
   a handle pivotally coupled to the seat shell such that first and second ends of the handle are mounted to the first and second handle mounts, respectively;
   first and second locking mechanisms associated with the first and second ends of the handle, respectively, the locking mechanisms being configured to lock the handle in position relative to the seat shell, the locking mechanisms having first and second actuators, respectively, configured to selectively unlock the respective locking mechanism; and
   an interconnecting apparatus connecting the first and second actuators such that moving one actuator to unlock the respective locking mechanism causes the other actuator to be simultaneously moved to release the other locking mechanism and permit the handle to pivot.

2. The safety seat of claim 1, wherein the first and second actuators are disposed on the first and second locking mechanisms, respectively, and each is movable between generally opposing locked and unlocked positions.

3. The safety seat of claim 2, wherein the interconnecting apparatus passes through an interior portion of the handle.

4. The safety seat of claim 3, wherein the interconnecting apparatus comprises a continuous cable loop extending between the first and second actuators and connected thereto, the loop being moved in a first direction by movement of the first actuator from the locked toward the unlocked position, cable loop movement in the first direction causing the second actuator to simultaneously move toward the unlocked position, the cable loop being moved in a second direction opposite of the first direction by movement of the second actuator from the locked toward the unlocked position, cable loop movement in the second direction causing the first actuator to simultaneously move toward the unlocked position.

5. The safety seat of claim 3, wherein the interconnecting apparatus comprises elongate first and second cables each having a first and a second end, the first ends being connected to the first actuator and the second ends being connected to the second actuator, the first cable being tensioned by movement of the first actuator from the locked toward the unlocked position, the first cable tension causing the second actuator to simultaneously move toward the unlocked position, the second cable being tensioned by movement of the second actuator from the locked toward the unlocked position, the second cable tension causing the first actuator to simultaneously move toward the unlocked position.

6. A child safety seat having a movable handle with a one-handed release mechanism comprising:
   a seat shell having an infant seating area and first and second handle mounts on opposing sides of the infant seating area;
   a handle pivotally coupled to the seat shell such that first and second ends of the handle are mounted to the first and second handle mounts, respectively; and
   first and second locking mechanisms associated with the first and second ends of the handle, respectively, the locking mechanisms being configured to lock the handle in one of a plurality of positions relative to the seat shell, the locking mechanisms having first and second actuators, respectively, configured to selectively unlock the respective locking mechanism, the first and second actuators being interconnected such that unlocking of one of the actuators causes the other actuator to be simultaneously unlocked thereby permitting the handle to pivot.

7. The safety seat of claim 6, wherein the first and second actuators are disposed on the first and second locking mechanisms, respectively, and each is movable between generally opposing locked and unlocked positions.

8. The safety seat of claim 7, further comprising an interconnecting apparatus connecting the first and second actuators and configured to move the first actuator and unlock its respective locking mechanism when the second actuator is moved toward the unlocked position to unlock its respective locking mechanism and permit the handle to pivot.

9. The safety seat of claim 8, wherein the interconnecting apparatus passes through an interior portion of the handle.

10. The safety seat of claim 9, wherein the interconnecting apparatus comprises elongate first and second cables each having a first and a second end, the first ends being connected to the first actuator and the second ends being connected to the second actuator, the first cable being tensioned by movement of the first actuator from the locked toward the unlocked position, the first cable tension causing the second actuator to simultaneously move toward the unlocked position, the second cable being tensioned by movement of the second actuator from the locked toward the unlocked position, the second cable tension causing the first actuator to simultaneously move toward the unlocked position.

11. The safety seat of claim 9, wherein the interconnecting apparatus comprises a continuous cable loop extending between the first and second actuators and connected thereto, the loop being moved in a first direction by movement of the first actuator from the locked toward the unlocked position, cable loop movement in the first direction causing the second actuator to simultaneously move toward the unlocked position, the cable loop being moved in a second direction opposite of the first direction by movement of the second actuator from the locked toward the unlocked position, cable loop movement in the second direction causing the first actuator to simultaneously move toward the unlocked position.

* * * * *